(12) United States Patent
Fuselier

(10) Patent No.: US 9,221,650 B1
(45) Date of Patent: Dec. 29, 2015

(54) APPARATUS AND METHOD FOR THE RECOVERY OF OIL ABSORBENT BOOMS

(76) Inventor: Charles Fuselier, St. Martinville, LA (US)

(*) Notice: Subject to any disclaimer, the term of this patent is extended or adjusted under 35 U.S.C. 154(b) by 1078 days.

(21) Appl. No.: 13/175,464

(22) Filed: Jul. 1, 2011

Related U.S. Application Data

(60) Provisional application No. 61/361,152, filed on Jul. 2, 2010.

(51) Int. Cl.
*B65H 51/10* (2006.01)
*B65H 57/14* (2006.01)
*E02B 15/06* (2006.01)
*E02B 15/08* (2006.01)

(52) U.S. Cl.
CPC ............... *B65H 51/10* (2013.01); *B65H 57/14* (2013.01); *E02B 15/06* (2013.01); *E02B 15/08* (2013.01); *B65H 2701/33* (2013.01); *B65H 2701/39* (2013.01)

(58) Field of Classification Search
CPC ........ B65H 20/02; B65H 20/04; B65H 27/00; B65H 51/10; B65H 57/14; B65H 2701/33; B65H 2701/39; E02B 15/06; E02B 15/08
USPC ............... 226/1, 90, 108, 168, 176, 177, 180, 226/181, 185, 186, 187; 242/535, 535.2, 242/535.3, 535.5, 564.4; 405/66
See application file for complete search history.

(56) References Cited

U.S. PATENT DOCUMENTS

| | | | | | |
|---|---|---|---|---|---|
| 1,437,843 | A | * | 12/1922 | Heinrichs | 271/274 |
| 3,459,354 | A | * | 8/1969 | Land et al. | 226/177 |
| 3,473,715 | A | * | 10/1969 | Shuey, Jr | 226/108 |
| 3,482,953 | A | * | 12/1969 | Bohy | 65/479 |
| 3,539,013 | A | * | 11/1970 | Smith | 210/242.4 |
| 3,715,068 | A | * | 2/1973 | Clarke et al. | 226/108 |
| 3,807,617 | A | | 4/1974 | Tanksley | |
| 3,871,618 | A | * | 3/1975 | Funk | 254/30 |
| 4,033,496 | A | * | 7/1977 | Rolfe | 226/188 |
| 4,089,178 | A | | 5/1978 | Kinase et al. | |
| 4,388,188 | A | | 6/1983 | Morris | |
| 4,480,800 | A | | 11/1984 | Oberg et al. | |
| 5,040,918 | A | | 8/1991 | Taricco | |
| 5,087,152 | A | | 2/1992 | Whidden | |
| 5,934,537 | A | * | 8/1999 | Miller | 226/182 |
| 6,119,910 | A | * | 9/2000 | Beaudoin | 226/90 |
| 6,305,592 | B1 | * | 10/2001 | Mann | 226/45 |
| 2006/0201987 | A1 | * | 9/2006 | Brown | 226/181 |
| 2008/0067280 | A1 | * | 3/2008 | Baker | 242/532.6 |

* cited by examiner

Primary Examiner — William E Dondero

(57) ABSTRACT

An oil containment boom recovery apparatus and method is disclosed. The apparatus is comprised of a frame that supports an axle with a pair of vehicle rim and tire combinations mounted in a side by side relationship on the axle at a desired spacing. A motor bracket to support a motor to rotate the axle, and thus the rim and tire combinations is provided. To recover a containment boom, a user will grab and lift an end segment of a boom and place it between the rim and tire combinations that are mounted on the axle. When the axle is turned by the motor, the boom will be gripped by and between the rotating tires as the tires and axle turn.

20 Claims, 3 Drawing Sheets

APPARATUS AND METHOD FOR THE RECOVERY OF OIL ABSORBENT BOOMS

PRIORITY

This application claims priority to U.S. provisional application entitled "Apparatus for Recovery of Oil Absorbent Booms" bearing Ser. No. 61/361,152 filed Jul. 2, 2010, the entire content of which is hereby incorporated by reference.

FIELD OF INVENTION

This invention relates to an apparatus and method to recover a resilient boom from the surface of a water body and, more particularly, relates to an apparatus where an oil soaked, oil recovery or containment boom may be recovered from a water surface and placed into a boat or other vessel with minimal contact with the boom by a user.

SUMMARY OF INVENTION

An apparatus and method to recover a boom, particularly oil soaked recovery or containment boom, from the surface of a water body is disclosed. The apparatus consists of a vertically extending frame that supports a horizontally oriented axle. Mounted in a side by side relationship on the axle is a pair of vehicle rim and tire combinations. The axle is turned by a motor assembly mounted on the frame.

The apparatus is intended to be mounted in or on a boat, barge, or other boom recovery vessel. The apparatus may also be used on an onshore location. To recover a boom, an end of the boom to be recovered is grabbed by a grapple, boat hook, or other apparatus and the boom end is lifted by the user from the water surface and placed between the tires that are mounted on the axle. When the axle is turned by the motor, the boom will be gripped by the rotating tires as the axle turns and the boom will be drawn up by the tires from the water surface and into the vessel or a container mounted in the vessel.

Use of the apparatus will reduce the physical contact with the boom by the operating personnel and serve to minimize the risk of harmful skin and body contact with the contents of the boom. Use of the apparatus will also reduce the physical exertion required for a worker to pull a boom from the water and thus serve to help prevent injury to recovery personnel. The apparatus is intended to be used with floating oil containment booms. However, the apparatus may also be used to recover other types of floating booms or even submerged or partially submerged booms.

DESCRIPTION OF THE EMBODIMENTS

Figure 1:
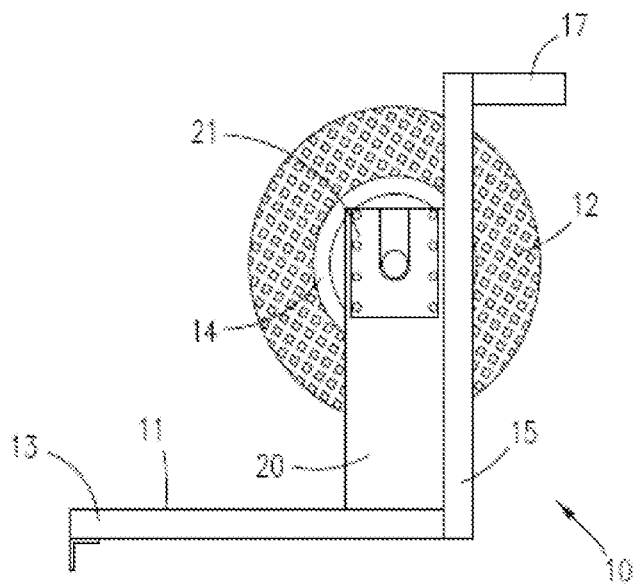
FIG. 1 shows a side elevation view of the boom recovery apparatus.
Figure 2:
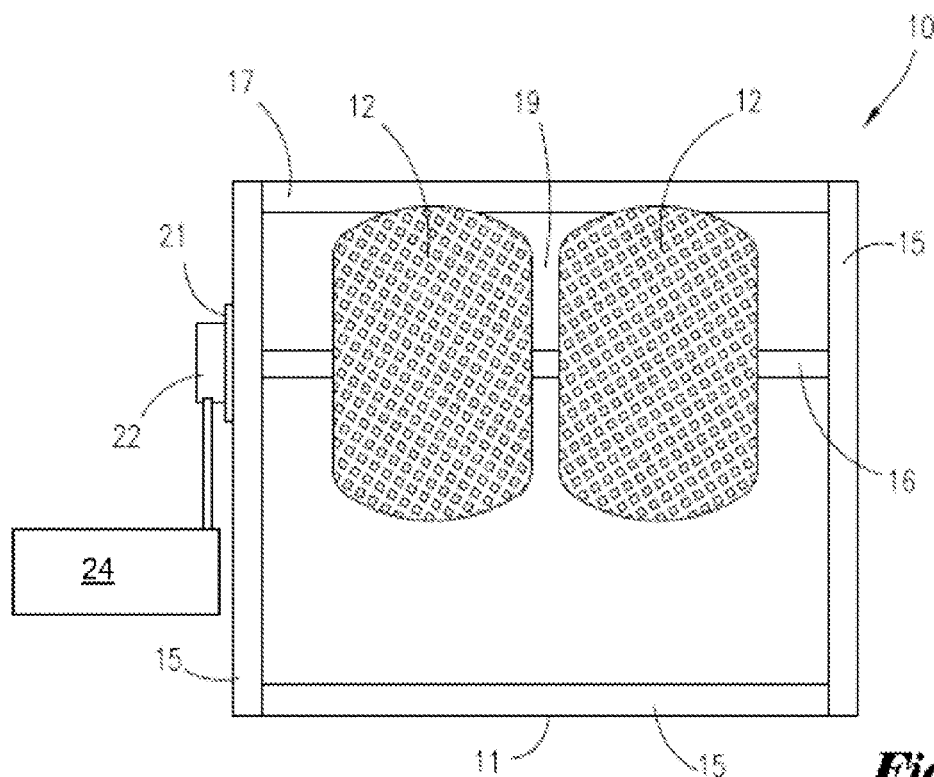
FIG. 2 shows a rear elevation view of the apparatus shown in FIG. 1.

Referring now to the drawings, as shown in FIG. 1 and FIG. 2, the apparatus (10) is comprised of a frame (11) having a base (13) and a pair of vertically extending supports (15). Mounted on each support (15) is an axle support plate (20) which also serves as a stiffener for the frame (11). An axle (16) is rotatably mounted at each end on the axle support plates (20) so that the axle (16) spans between the vertically extending supports (15). An axle support stiffener plate (21) may also be provided to stiffen the support plates (20). The frame (11) may have a guard bar (17) to serve to prevent unwanted contact with the tires (12). The guard bar (17) may also serve as a support for boom (40) as it is loaded onto the vessel.

As further shown in FIG. 2, and view of the boom recovery apparatus (10), the axle (16) supports a pair of vehicle rims (14) that are mounted in a side by side relationship on the axle (16). The rims (14) are mounted so that when the axle (16) is rotated, the rims (14) will rotate with the axle (16). The rims (14) are provided with a flexible, resilient surface such as a vehicle tire (12) mounted on each rim (14).

The rims (14) are configured so that there is a desired space or gap (19) between the rims and the flexible, resilient surfaces provided by each of the tires (12). This gap (19) between the surfaces of each of tires (12) should be sufficient to allow an absorbent boom to be received between the tires (12) and for the boom to be gripped or frictionally engaged by the surfaces of the tires (12).

A motor bracket (21) is provided mounting a motor (22) to rotate the axle (16). When the axle (16) is rotated by a motor (22) this rotation provides corresponding rotation to the tires (12) mounted on the rims (14). It is thought that the motor (22) will be a direct drive hydraulic motor so as to reduce sparking when the apparatus is used in a potentially flammable environment. Other types of motors may also be utilized.

Figure 3:
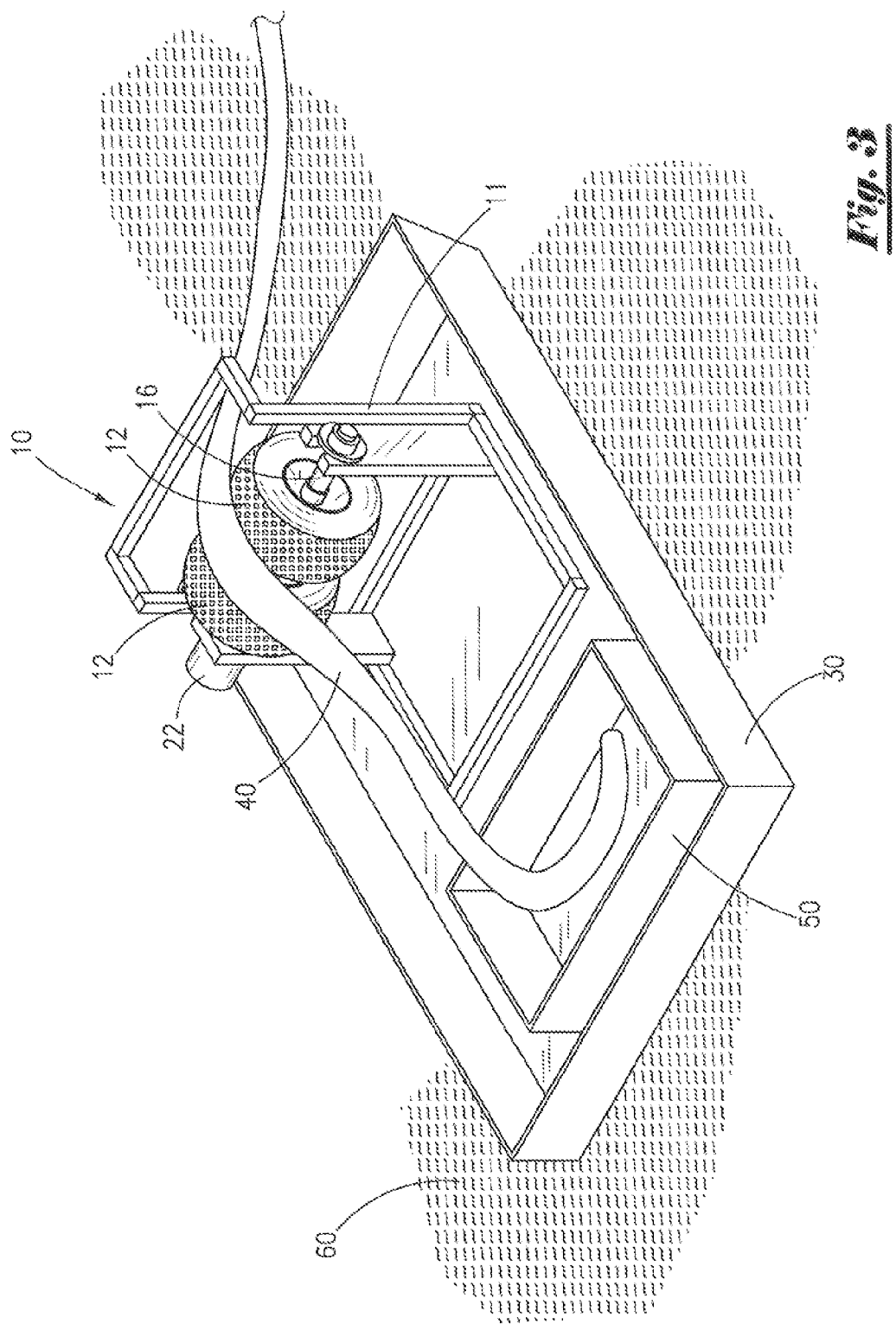
FIG. 3 is a perspective view of the apparatus in operation on a vessel for the recovery of an oil absorbent boom.

FIG. 3 shows the apparatus (10) in use for the recovery of a resilient boom (40). The apparatus (10) is placed in a boat or other vessel (30) so that it may be used on the surface of a water body (60). The motor (22) of the apparatus (10) is connected to a hydraulic system (not shown) to rotate the axle (16) and impart corresponding rotation to the tires (12). The apparatus (10) may also be placed on a shoreline or a pier to recover a boom (40) located upon adjacent waters.

For use of the apparatus (10) to recover a boom (40) from a water body (60), a user will grab and lift an end segment or section of the boom (40) by means of a grapple, boat hook, by hand, or with another apparatus and place the end segment or section of boom (40) in the gap (19) between the tires (12) that are mounted on the axle (16) of the apparatus (10). When the axle (16) is turned by the motor (22), the tires (12) will rotate simultaneously and the boom (40) will be gripped by and between the surfaces of the rotating tires (12) as the tires and axle turn and the boom (40) be pulled along its length by and between the tires (12).

As the axle (16) rotates, the boom (40) will be drawn up by the tires (12) and pulled from the water surface (60) and into the vessel (30). As the boom (40) is pulled from water (60), the boom (40) is supported on the guard bar (17). The vessel (30) may be provided with a boom container (50) to collect the boom (40) and hold any residual oil or contaminants retained by the boom. The guard bar (17) may serve as a support for boom (40) as the boom (40) is pulled by the rotating tires (12) from the water.

A control system 24 (shown in FIG. 2) will be provided to allow the worker to control the motor and the rotation of the axle (16) and thus the recovery speed of the boom (40).

Figure 5:
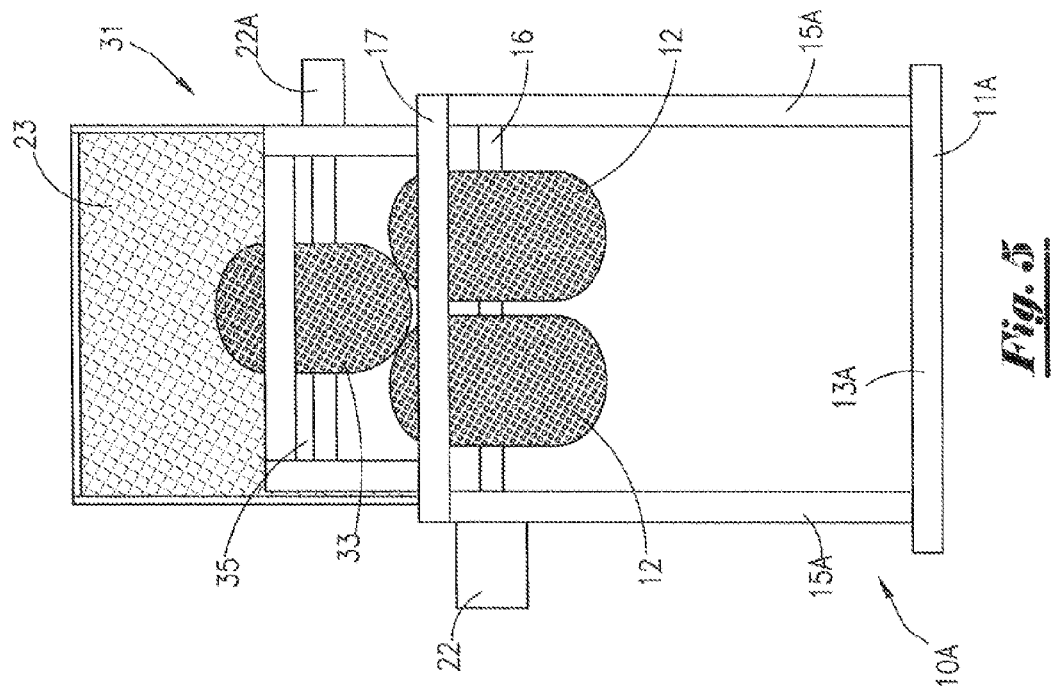
FIG. 5 is a rear elevation view of the apparatus shown in FIG. 4.
Figure 4:
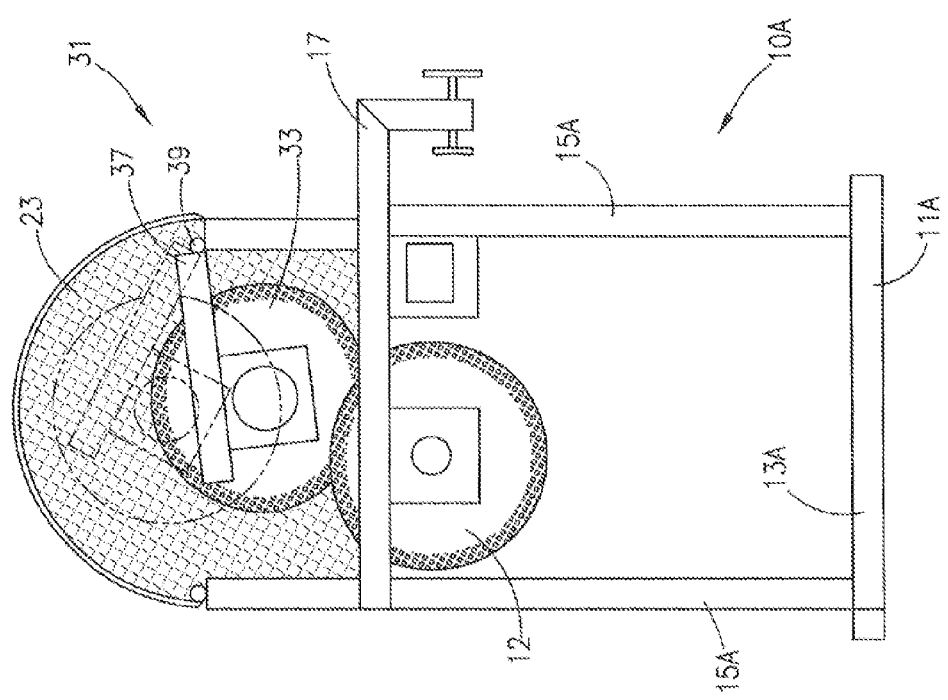
FIG. 4 is a side elevation view of an alternate embodiment of the boom recovery apparatus.

FIGS. 4 and 5 show an alternate embodiment of the boom recovery apparatus. As shown in FIG. 4, a side elevation view, the apparatus (10A) is comprised of comprised of a frame (11A) having a base (13A) and vertically extending supports (15A). The frame (11A) supports the rotatable axle (16), and in turn the tires (12) and (14), which are rotated by the motor (22) in the manner described above for apparatus (10).

The frame (11A) is shown with a supplemental boom support and guide (31) for positioning and supporting the boom (40) against the tires (12) as the tires (12) and rims (14) are rotated on axle (16). As shown the guide (31) is a tire and rim combination (33) mounted on a rotatable guide axle (35). The axle (35) is mounted on a pivotally positional guide frame (37) mounted on hinge (39). The pivotally positional guide frame (39) will swing upward to allow the boom (40) to be positioned between the tire and rim combination (33) and the tires (12) on axle (16) when the apparatus (10A) is in use. When so positioned, the tire and rim combination (33) will rotate on the guide axle (35) and hold and support the boom (40) in the gap (19) against the tires (12) as the boom (40) is pulled by the rotating tires (12).

As further shown in FIGS. 4 and 5, a second hydraulic motor (22A) may be provided to rotate axle (35) and thereby the tire and rim combination (33). The rotation of the tire and rim combination (33) provided by the motor (22A) will supplement the gripping force applied to the boom (40) by the rotating tires (12) and enhance the pulling of the boom (40). The apparatus (10A) may have a hood (23) that serves as a safety guard for the rotating tires (12).

It is thought that the apparatus and method of the present invention and many of its attendant advantages will be understood from the foregoing description. It is also thought that it will be apparent that various changes may be made in the arrangement of the parts and steps of the apparatus and method without departing from the spirit and scope of the invention or sacrificing all of its material advantages, the apparatus described herein and its method of use being merely an exemplary embodiment of the invention.

I claim:

1. An apparatus for recovery of a floating oil containment boom comprising:
   (a) a frame, said frame having a base;
   (b) a pair of vertically extending axle supports mounted on said frame;
   (c) an axle is rotatably mounted at each end on said axle supports whereby said axle spans between said pair of axle supports;
   (d) first and second tire rims mounted in a side by side relationship on said axle whereby a desired gap between said first and second tire rims is created;
   (e) a tire mounted on each rim of said first and second tire rims; and
   (f) means for rotating said axle and thereby said first and second tire rims and said mounted tires; and
   (g) wherein said oil containment boom is positioned on each said tire between said first and second tire rims whereby rotation of said axle, and thus said rims and said tires, will engage said tires with said oil containment boom thereby drawing said oil containment boom along said rotating tires.

2. The apparatus as recited in claim 1, wherein said means for rotating said axle is a motor.

3. The apparatus as recited in claim 2, wherein said motor is a hydraulic motor.

4. The apparatus as recited in claim 3 wherein each end of said axle is rotatably mounted on a support plate attached to each said axle support of said pair of axle supports.

5. The apparatus as recited in claim 4 further comprising a motor support bracket mounted to one of said axle supports.

6. The apparatus as recited in claim 5 wherein said tires are motor vehicle tires.

7. The apparatus as recited in claim 4 further comprising a control system to regulate rotation of said axle and thereby said rims and tires.

8. The apparatus as recited in claim 7 wherein said motor is a direct drive hydraulic motor.

9. A method of recovering an oil containment boom comprising the steps of:
   (a) providing a pair of vehicle tires mounted in a side by side relationship on an axle;
   (b) providing means for rotating said axle and thereby said pair of vehicle tires;
   (c) placing a length of said boom upon said pair of vehicle tires in a space created between said tires of said pair of vehicle tires; and
   (d) rotating said axle and thereby said pair of vehicle tires whereby said length of boom is pulled along between said pair of vehicle tires.

10. The method of recovering an oil containment boom as recited in claim 9 further comprising the step of configuring said tires on said axle whereby a desired gap is maintained between said tires.

11. The method of recovering an oil containment boom as recited in claim 10 wherein said means for rotating said axle and thereby said pair of vehicle tires is a direct drive hydraulic motor.

12. The method of recovering an oil containment boom as recited in claim 11 further comprising the step of providing means for supporting said boom as it is drawn between said tires.

13. A boom recovery apparatus comprising:
   (a) first and second rims positioned laterally from each other at a desired spaced apart relationship, each of said first and second rims having a mounted tire;
   (b) means for simultaneously rotating said first and second rims with said mounted tires; and
   (c) a length of boom, said boom positioned on mounted tires of said rotating rims between said first and second rims with said mounted tires whereby upon rotation of said first and second rims with said mounted tires, said tires will engage with said length of boom thereby drawing said length of boom along said mounted tires of said rotating rims.

14. The apparatus as recited in claim 13 wherein, said tires have a resilient outer surface.

15. The apparatus as recited in claim 13 wherein said tires are vehicle tires.

16. The apparatus as recited in claim 15 wherein said means for simultaneously rotating said first and second rims with said mounted tires is a hydraulic motor.

17. The apparatus as recited in claim 16 wherein said first and second rims with said mounted tires are mounted on a single axle.

18. The apparatus as recited in claim 17, further comprising means for supporting said boom as it is drawn between said first and second tires.

19. The apparatus as recited in claim 17, further comprising a third tire, said third tire rotatably mounted between said first and second tires whereby said third tire will support and hold said length of boom against said first and second tires.

20. The apparatus as recited in claim 19, further comprising a motor for rotating said third tire.

* * * * *